(12) United States Patent
Wang

(10) Patent No.: US 10,350,749 B2
(45) Date of Patent: Jul. 16, 2019

(54) ROBOT CONTROL DEVICE HAVING LEARNING CONTROL FUNCTION

(71) Applicant: FANUC CORPORATION, Yamanashi (JP)

(72) Inventor: Kaimeng Wang, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 76 days.

(21) Appl. No.: 15/792,832

(22) Filed: Oct. 25, 2017

(65) Prior Publication Data

US 2018/0117758 A1 May 3, 2018

(30) Foreign Application Priority Data

Nov. 1, 2016 (JP) .................................. 2016-214392

(51) Int. Cl.
| | |
|---|---|
| *B25J 9/16* | (2006.01) |
| *G05B 19/423* | (2006.01) |
| *B25J 9/00* | (2006.01) |
| *B25J 13/08* | (2006.01) |

(52) U.S. Cl.
CPC ............. *B25J 9/0081* (2013.01); *B25J 9/163* (2013.01); *B25J 9/1664* (2013.01); *B25J 9/1676* (2013.01); *B25J 13/08* (2013.01); *G05B 19/423* (2013.01)

(58) Field of Classification Search
CPC ........ B25J 9/0081; B25J 9/163; B25J 9/1664; B25J 9/1692; G05B 19/42; G05B 19/423; G05B 19/425; G05B 19/427
See application file for complete search history.

(56) References Cited

U.S. PATENT DOCUMENTS

| | | | | |
|---|---|---|---|---|
| 4,764,883 A | * | 8/1988 | Nakagawa | ........... G05B 19/423 |
| | | | | 700/251 |
| 2004/0193320 A1 | * | 9/2004 | Watanabe | .............. B25J 9/1664 |
| | | | | 700/245 |

FOREIGN PATENT DOCUMENTS

| | | |
|---|---|---|
| JP | H1-211102 A | 8/1989 |
| JP | H2-39304 A | 2/1990 |
| JP | H4-355805 A | 12/1992 |
| JP | H6-274228 A | 9/1994 |
| JP | H7-306707 A | 11/1995 |
| JP | 2004-227163 A | 8/2004 |
| JP | 2004-330321 A | 11/2004 |
| JP | 2006-172149 A | 6/2006 |
| JP | 2009-83074 A | 4/2009 |

* cited by examiner

Primary Examiner — Spencer D Patton
(74) Attorney, Agent, or Firm — Hauptman Ham, LLP

(57) ABSTRACT

A robot control device includes a learning control unit for calculating a learning correction amount, a position storage unit for storing a position of a leading end of a robot mechanism part during the learning control, and a speed storage unit for storing a speed of the leading end of the robot mechanism part during the learning control. The robot control device determines, while the robot mechanism part is operated by a position command after the learning control, whether or not the position and the speed of the leading end are in an abnormal state based on errors with respect to the position and the speed of the leading end stored during the learning control. The robot control device switches a determination as to whether the learning correction amount is applied in accordance with this determination result.

6 Claims, 7 Drawing Sheets

10,350,749 B2

ROBOT CONTROL DEVICE HAVING LEARNING CONTROL FUNCTION

RELATED APPLICATIONS

The present application claims priority to Japanese Patent Application No. 2016-214392 filed Nov. 1, 2016, the disclosure of which is hereby incorporated by reference herein in its entirety.

BACKGROUND OF THE INVENTION

1. Field of the Invention

The present invention relates to a robot control device that has learning control function.

2. Description of the Related Art

In the related art, position feedback control, speed feedback control, and current feedback control are generally performed in order to control a position and speed of a driven member that is driven by a servomotor. However, even if such feedback controls are performed, in the case where rigidity of the driven member is low, and the driven member is operated at high acceleration, a position shift of the driven member occurs so that the positional precision of the driven member is not stable in some cases. Accordingly, it is proposed in the related art to perform learning control in order to enhance the positional precision of the driven member.

For example, it is disclosed in Japanese Unexamined Patent Publication No. 2006-172149A that, in a machine tool main body including a driven member to which a workpiece is attached and which is driven by a servomotor, and an attachment member to which a tool for machining the workpiece is attached, the learning control is performed while an acceleration sensor is attached on a leading end point of the attachment member.

The learning control is a process for determining a learning correction amount that causes a positional deviation, which is a difference between a position command value and a position feedback value, to converge on nearly zero with respect to a command by which operations of the same-pattern are repeated at a predetermined period.

Specifically, a difference between the position command value inputted to a control circuit for controlling the servomotor and the position feedback value outputted from a position detector for detecting a position of the driven member (hereinafter, referred to as a first positional deviation) is obtained every time the position command is inputted. At this time, by integrating twice an acceleration value that is detected by the acceleration sensor attached on the leading end point of the attachment member, a position shift amount (displacement amount) of the leading end point of the attachment member is also obtained. This position shift amount is added to the first positional deviation described above, whereby a positional error of the leading end point of the attachment member with respect to the commanded position (hereinafter, referred to as a second positional deviation) is calculated. When the second positional deviation that is calculated as described above converges on zero, the position of the leading end point of the attachment member matches the position of the position command. Accordingly, the correction amount for causing the second positional deviation to converge on zero (hereinafter, referred to as the learning correction amount) is calculated.

By repeating a series of the above-described processes by predetermined times of trial in response to the same movement command, the learning correction amount described above is updated until the second positional deviation has converged on a value that is not greater than a predetermined threshold value near zero, thereby the best value of the learning correction amount can be obtained. The best value of the learning correction amount is stored in a memory in a control device. The above-described control process is referred to as "learning control".

After the learning control having been ended, the acceleration sensor is detached from the leading end point of the attachment member. In regular control after the learning control, the control is performed by the same movement command as the time of learning control, and the best value of the learning correction amount described above is applied to the first positional deviation.

It is disclosed in Japanese Unexamined Patent Publication No. 2006-172149A that, at the time of learning control, a positional error of the leading end point of the attachment member is estimated with respect to the commanded position by using a mechanical model without attaching the acceleration sensor on the leading end point of the attachment member.

Further, Japanese Unexamined Patent Publication No. 2009-83074A discloses a control device for a machine tool that includes a learning control unit configured to calculate a position correction amount for reducing a positional deviation that is a difference between a position command value and a position feedback value in order to suppress a variation in rotational drive force of a servomotor for rotating the workpieces.

SUMMARY OF INVENTION

As described above, practical use of the techniques that are related to the learning control has been developed in the field of the machine tool. Also in the case of an industrial robot, as the weight of a tool attached to a leading end of an arm is higher or rigidity of the arm is lower, vibrations and swings that is generated at the tool attached to the leading end of the arm during the operation become greater, thereby the positional precision of the tool is deteriorated. Accordingly, an application of the learning control to operations of the robot is also under consideration. In particular, the learning control is effective in the case where work of the same pattern is repeatedly carried out by a robot.

However, there is a case in which a learning control technique that is used in the machine tool cannot be applied to the control of the robot without any modification.

In other words, the learning control is a process on the assumption that movement commands of the same pattern are repeatedly inputted to a motor control circuit by predetermined times at a predetermined period. In the case of a machine tool, it is meaningful to perform the learning control since a trajectory and a speed of a movement driver to which a workpiece is attached are not largely different between the time of learning control and the time of an actual operation. On the other hand, in the case of an industrial robot, a movement pattern of the tool of the robot changes in many cases depending on peripheral devices in a production line during the operation of the robot. For example, there is a case in which, during the operation of the robot, the tool needs to be moved to a standby position in order to wait for input of an external signal or the movement pattern of the tool is switched in order for the robot to carry out another operation. In addition, there is a case in which a user operates the robot with a teach pendant in order to instruct the robot on the movement pattern of the tool or modify the movement pattern of the tool. Due to the factors described above, in actual operation of the robot after the learning control, the tool of the robot is not completely moved on the same trajectory or at the same speed as the time of learning control. When the learning correction amount obtained through the learning control is applied to operation of the robot with the different trajectory or speed from the time of learning control as described above, the vibrations of the tool may not converge, and on the contrary, the vibrations thereof may diverge. Because of this, in reality, the learning control technique is hardly used in the industrial robots.

In consideration of the above issues, an object of the invention is to provide a robot control device capable of achieving robot operation with high precision by efficiently suppressing vibrations or swings that can be generated at a leading end of a robot mechanism part.

In order to accomplish the above object, there is provided a robot control device configured to control operations of a robot mechanism part that is driven by a servomotor in an aspect of the invention. The robot control device includes a learning control unit configured to perform the learning control so as to calculate a learning correction amount for correcting a position of a leading end of the robot mechanism part when the robot mechanism part is operated by a position command. The robot control device includes a position storage unit configured to store the position of the leading end of the robot mechanism part at a predetermined time interval while the learning control is performed, and a speed storage unit configured to store a speed of the leading end of the robot mechanism part at a predetermined time interval while the learning control is performed. The robot control device includes positional error calculation unit configured to calculate, while the robot mechanism part is operated by the position command after the learning control, a positional error between an actual position of the leading end obtained at a predetermined time interval and the position of the leading end that corresponds to the actual position and is stored in the position storage unit. The robot control device includes a speed error calculation unit configured to calculate, while the robot mechanism part is operated by the position command after the learning control, a speed error between an actual speed of the leading end obtained at the predetermined time interval and the speed of the leading end that corresponds to the actual speed and is stored in the speed storage unit. The robot control device includes a learning correction amount application-determination unit configured to determine, while the robot mechanism part is operated by the position command after the learning control, whether the position and the speed of the leading end are in an abnormal state or in a normal state on the basis of the positional error and the speed error and then switch a determination as to whether or not the learning correction amount is applied to the position of the leading end in accordance with this determination result.

Further, according to another aspect of the invention, such a robot control device is provided that, in the robot control device of the above-described aspect, the learning correction amount application-determination unit is configured to determine that the position or the speed of the leading end is in the abnormal state when the positional error exceeds a predetermined first threshold value or the speed error exceeds a predetermined second threshold value, and not apply the learning correction amount.

According to another aspect of the invention, such a robot control device is provided that, in the robot control device of the above-described aspect, the learning correction amount application-determination unit is configured to determine that the position and the speed of the leading end is in the normal state when the positional error is not greater than the predetermined first threshold value and the speed error is not greater than the predetermined second threshold value, and apply the learning correction amount.

According to another aspect of the invention, such a robot control device is provided that, in the robot control device of the above-described aspect, the robot control device further includes a speed command adjusting unit configured to adjust the speed of the leading end to not greater than a predetermined safety speed when the position or the speed of the leading end is determined to be in the abnormal state by the learning correction amount application-determination unit.

According to another aspect of the invention, such a robot control device is provided that, in the robot control device of the above-described aspect, the learning control unit is configured to store a plurality of learning correction amounts each corresponding to a plurality of different operations related to the robot mechanism part.

According to another aspect of the invention, such a robot control device is provided that, in the robot control device of the above-described aspect, the learning correction amount application-determination unit is configured to apply the learning correction amount corresponding to the operation of the robot mechanism part in the normal state from among a plurality of the learning correction amounts stored in the learning control unit when a result of determination on the position or the speed of the leading end is switched to the normal state.

The objects, features and advantages as described above, and another objects, features and advantages of the present invention will become more apparent from the following description of the embodiments in connection with the accompanying drawings.

DETAILED DESCRIPTION

Figure 1:
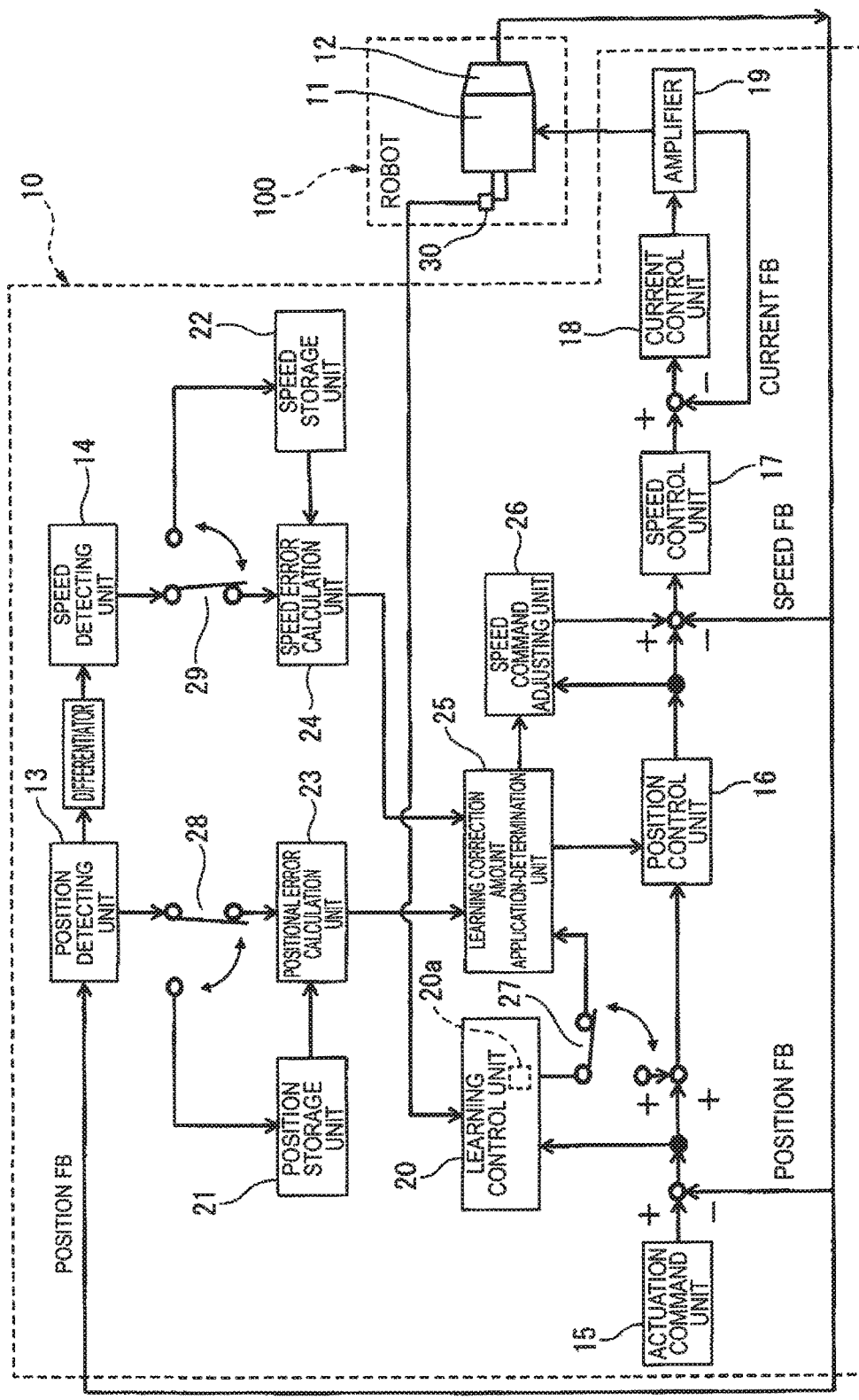
FIG. 1 is a block diagram for illustrating a robot control device according to an embodiment of the invention.

Hereinafter, embodiments of the present invention will be described with reference to the drawings. In the drawings referred to, same constituent sections or functional sections are assigned the same reference numerals. Scales of the drawings are appropriately changed in order to make it easy to understand the drawings. Note that modes illustrated in the drawings are merely examples in order to implement the present invention, and the present invention is not limited to the modes illustrated in the figures.

FIG. 1 is a block diagram for illustrating a robot control device 10 according to an embodiment of the present invention. The robot control device 10 according to the present embodiment is a device configured to control a robot 100 that includes a plurality of arms (not illustrated) being jointed via articulated shafts driven by a servomotor 11. The robot 100 is, for example, a vertical articulated robot for industrial use. For example, a work tool such as a grip hand, a tool, or a welding gun (not illustrated) is attached to a leading end on a distal side of the arm of the robot 100 (hereinafter, referred to as a leading end of a robot mechanism part).

As illustrated in FIG. 1, a pulse coder 12, for example, a rotary encoder that are configured to detect a position FB (position feedback value) and a speed FB (speed feedback value) is incorporated in the servomotor 11. The robot control device 10 includes a position detecting unit 13 configured to detect a position of the leading end of the robot mechanism part and a speed detecting unit 14 configured to detect a speed of the leading end of the robot mechanism part in the robot 100.

The position detecting unit 13 calculates the position of the leading end of the robot mechanism part by forward-converting the position FB. The speed detecting unit 14 calculates the speed by differentiating the position of the leading end that is calculated by the position detecting unit 13.

By further referring to FIG. 1, the robot control device 10 includes an actuation command unit 15, a position control unit 16, a speed control unit 17, a current control unit 18, and an amplifier 19 as basic constituent elements for controlling the servomotor 11.

The actuation command unit 15 outputs a command for operation of the robot (position command value) to the position control unit 16 in accordance with a robot operation program that is prepared in advance or an operation command from a teach pendant (not illustrated). The robot operation program is stored in a memory such as a ROM in the robot control device 10.

The position control unit 16 processes a positional deviation amount that is a difference between the position command value given from the actuation command unit 15 and the position FB detected by the pulse coder 12, and outputs a speed command value to the speed control unit 17.

The speed control unit 17 processes a speed deviation amount that is a difference between the speed command value given from the position control unit 16 and the speed FB detected by the pulse coder 12, and outputs a current command value to the current control unit 18.

The current control unit 18 processes a current deviation amount that is a difference between the current command value given from the speed control unit 17 and a current FB (i.e., a current feedback value) from the amplifier 19, and outputs a current command value (torque command value) to the amplifier 19.

The amplifier 19 receives each current command value from the current control unit 18, and produces a driving current for driving the servomotor 11 on the basis of the received current command value so as to rotationally drive the servomotor 11.

When the servomotors 11 that are jointed to the articulated shafts of the robot 100 are rotationally driven in accordance with the position command value from the actuation command unit 15, the work tool attached to the leading end of the robot mechanism part of the robot 100 moves to a position that is specified by the command.

Further, as illustrated in FIG. 1, the robot control device 10 of the present embodiment includes a learning control unit 20, a position storage unit 21, a speed storage unit 22, a positional error calculation unit 23, a speed error calculation unit 24, a learning correction amount application-determination unit 25, and a speed command adjusting unit 26. Hereinafter, functions of the constituent elements will be described in detail.

The learning control unit 20 is a functional section configured to perform so-called "learning control", as described in the column of Background of the invention. That is, the learning control unit 20 is configured to perform the learning control for calculating the learning correction amount so as to correct the position of the leading end of the robot mechanism part when the robot mechanism part is operated by the position command.

More specifically, the learning control unit 20 is configured to obtain a learning correction amount for causing a positional deviation amount, which is a difference between the position command value given from the actuation command unit 15 and a position detected by a sensor 30 attached to the leading end of the robot mechanism part of the robot 100, to converge on nearly zero. Here, any device that monitors the position or displacement of the leading end of the robot mechanism part of the robot 100 can be used as the sensor 30. As the above-mentioned device, for example, a device capable of measuring a position or displacement such as an acceleration sensor, gyro sensor, inertial sensor, laser tracker, camera, or motion capture device, can be employed. Although the position of the leading end of the robot mechanism part detected by the sensor 30 is used when the learning correction amount is obtained, the sensor 30 is detached from the leading end of the robot mechanism part after the learning control is ended. In addition, the learning control unit 20 is configured to determine the best value with respect to the same actuation command that is repeated by predetermined times at a predetermined period while updating the learning correction amount every time the command is repeated. Since a specific configuration of the learning control unit 20 is the same as that of known devices such as the device that is described in Japanese Unexamined Patent Publication No. 2006-172149A (e.g., see FIG. 2, FIG. 4, and FIG. 6), the description thereof is omitted herein.

The learning control unit 20 of the present embodiment includes a switch 27 that is provided at an output section and configured to switch an output destination of the learning correction amount to one of the position control unit 16 and the learning correction amount application-determination unit 25.

When the robot operation by the learning control is carried out, the switch 27 is switched so that the output of the learning control unit 20 is connected to the input of the position control unit 16. The learning control unit 20 includes a memory 20*a* configured to store the learning correction amounts, and every time the same actuation command is repeated, the learning correction amount is written into the memory 20*a* so as to be updated.

After the learning control is ended, in the case where the robot 100 is actually operated by the actuation command when the learning control was performed, the switch 27 is switched so that the output of the learning control unit 20 is connected to the input of the learning correction amount application-determination unit 25 (the state of the switch 27 illustrated in FIG. 1). By adopting this control, the learning correction amount stored in the memory 20*a* is outputted to the position control unit 16 through the learning correction amount application-determination unit 25.

The position storage unit 21 stores the positions of the leading end of the robot mechanism part detected by the position detecting unit 13 at a predetermined time interval T during the robot operation by the learning control. After the learning control is ended, position data (trajectory data) of the leading end of the robot mechanism part when the robot was operated by the learning control is stored in the position storage unit 21.

The speed storage unit 22 stores the speeds of the leading end of the robot mechanism part detected by the speed detecting unit 14 at the predetermined time interval T during the robot operation by the learning control. After the learning control is ended, speed data of the leading end of the robot mechanism part when the robot was operated by the learning control is stored in the speed storage unit 22.

A memory unit such as a random access memory (RAM), a magnetic storage unit such as a hard disk, and the like, can be used for the position storage unit 21, the speed storage unit 22, the memory 20*a*, and the like. Although the position storage unit 21, the speed storage unit 22, and the memory 20*a* illustrated in FIG. 1 are separately provided, they may be provided as different storage regions that are assigned in a single storage unit.

The positional error calculation unit 23 is configured to receive actual positions of the leading end of the robot mechanism part, after the learning control, from the position detecting unit 13 at the predetermined time interval T while the robot 100 is operated by the actuation command for the learning control.

Further, the positional error calculation unit 23 is configured to calculate an error between the actual position of the leading end of the robot mechanism part that is received from the position detecting unit 13 at the predetermined time interval T, and the position of the leading end of the robot mechanism part, which corresponds to the actual position and is stored in the position storage unit 21. Hereinafter, this error is referred to as a positional error.

The speed error calculation unit 24 is configured to receive actual speeds of the leading end of the robot mechanism part, after the learning control, from the speed detecting unit 14 at the predetermined time interval T while the robot 100 is operated by the actuation command for the learning control.

Further, the speed error calculation unit 24 is configured to calculate an error between the actual speed of the leading end of the robot mechanism part that is received from the speed detecting unit 14 at the predetermined time interval T, and the speed of the leading end of the robot mechanism part that corresponds to the actual speed and is stored in the speed storage unit 22. Hereinafter, this error is referred to as a speed error.

Note that the position data that are stored in the position storage unit 21 needs to be protected from being overwritten with the position data that are outputted from the position detecting unit 13 during the period in which the robot 100 is actually operated after the learning control. Further, the speed data that are stored in the speed storage unit 22 needs to be protected from being overwritten with the speed data that are outputted from the speed detecting unit 14 during the period in which the robot 100 is actually operated after the learning control.

Accordingly, the output section of the position detecting unit 13 is connected to a switch 28 that is configured to set an output destination of the position detecting unit 13 to the position storage unit 21 at the time of learning control and set the output destination of the position detecting unit 13 to the positional error calculation unit 23 when the robot 100 is actually operated after the learning control. The output section of the speed detecting unit 14 is also connected to a switch 29 that is configured to set an output destination of the speed detecting unit 14 to the speed storage unit 22 at the time of learning control and set the output destination of the speed detecting unit 14 to the speed error calculation unit 24 when the robot 100 is actually operated after the learning control. During the actual operation of the robot 100 after the learning control, the switch 28 and the switch 29 are in a state as illustrated in FIG. 1.

The switch 27, switch 28, and switch 29 described above are preferably configured to be switched in response to input of a learning control start signal to the robot control device 10 or input of a regular operation start signal thereto, for example.

The learning correction amount application-determination unit 25 is configured to determine whether the position or the speed of the leading end of the robot mechanism part is in an abnormal state or in a normal state on the basis of the positional error or the speed error that is calculated by the positional error calculation unit 23 or the speed error calculation unit 24, respectively.

"Abnormality" in the present specification means a state in which the position and the speed of the leading end of the robot mechanism part during the actual operation of the robot 100 after the learning control deviate a predetermined threshold range with respect to the position and the speed of the robot mechanism part when the learning control was performed. "Normality" is a state of not "abnormality".

Moreover, the learning correction amount application-determination unit 25 is configured not to output the learning correction amount that is stored in the memory 20*a* of the learning control unit 20 to the position control unit 16 in the case where at least one of the position and the speed of the leading end of the robot mechanism part is determined to be in the abnormal state. More specifically, in the case where at least one of the positional error and the speed error that relates to the leading end of the robot mechanism part exceeds a predetermined threshold value, the learning correction amount application-determination unit 25 determines that the abnormal state is generated and does not apply the learning correction amount.

Further, the learning correction amount application-determination unit 25 is configured to output the learning correction amount that is stored in the memory 20*a* of the learning control unit 20 to the position control unit 16 when both the position and the speed of the leading end of the robot mechanism part are determined to be in the normal state. More specifically, when the positional error and the speed error that is related to the leading end of the robot mechanism part are not greater than the respective predetermined threshold values, the learning correction amount application-determination unit 25 determines that an abnormal state is not generated and applies the learning correction amount.

To sum up, the learning correction amount application-determination unit 25 determines whether the position and the speed of the leading end of the robot mechanism part in the actual operation of the robot 100 are in the abnormal state or in the normal state in comparison with the position and the speed at the time of learning control. Then, in the case of the abnormal state, the learning correction amount application-determination unit 25 does not apply the learning correction amount to the positional deviation amount described above. In the case of the normal state, the learning correction amount application-determination unit 25 applies the learning correction amount to the positional deviation amount described above.

The learning correction amount application-determination unit 25 described above preferably includes a setting unit (not illustrated) configured to set the threshold value that is used for determining presence or absence of abnormality related to each of the position and the speed of the leading end of the robot mechanism part described above. The setting unit is preferably formed in such a manner that the above threshold values can be rewritten by an external device of the robot control device 10.

The speed command adjusting unit 26 is configured to receive the presence or absence of abnormality from the learning correction amount application-determination unit 25, and adjust the speed of the leading end of the robot mechanism part to a speed that is not greater than a predetermined safety speed in the case where the abnormality is present.

More specifically, when the position and the speed of the leading end of the robot mechanism part are determined to be in the abnormal state, the learning correction amount application-determination unit 25 outputs a signal indicating the occurrence of abnormality (hereinafter, referred to as an abnormality detection signal) to the speed command adjusting unit 26. The speed command adjusting unit 26 decreases the speed command value from the position control unit 16 at predetermined rate and outputs the decreased speed command value to the speed control unit 17 only when receiving the abnormality detection signal. By adopting this control, the speed of the leading end of the robot mechanism part (rotation speed of the servomotor 11) is decreased to a speed not greater than the predetermined safety speed. On the other hand, while an abnormality detection signal is not outputted, the adjustment for decreasing the speed command value from the position control unit 16 is not carried out.

The robot control device of the present invention does not necessarily include the above-described speed command adjusting unit 26.

[Operations of Robot Control Device 10]

Figure 2:
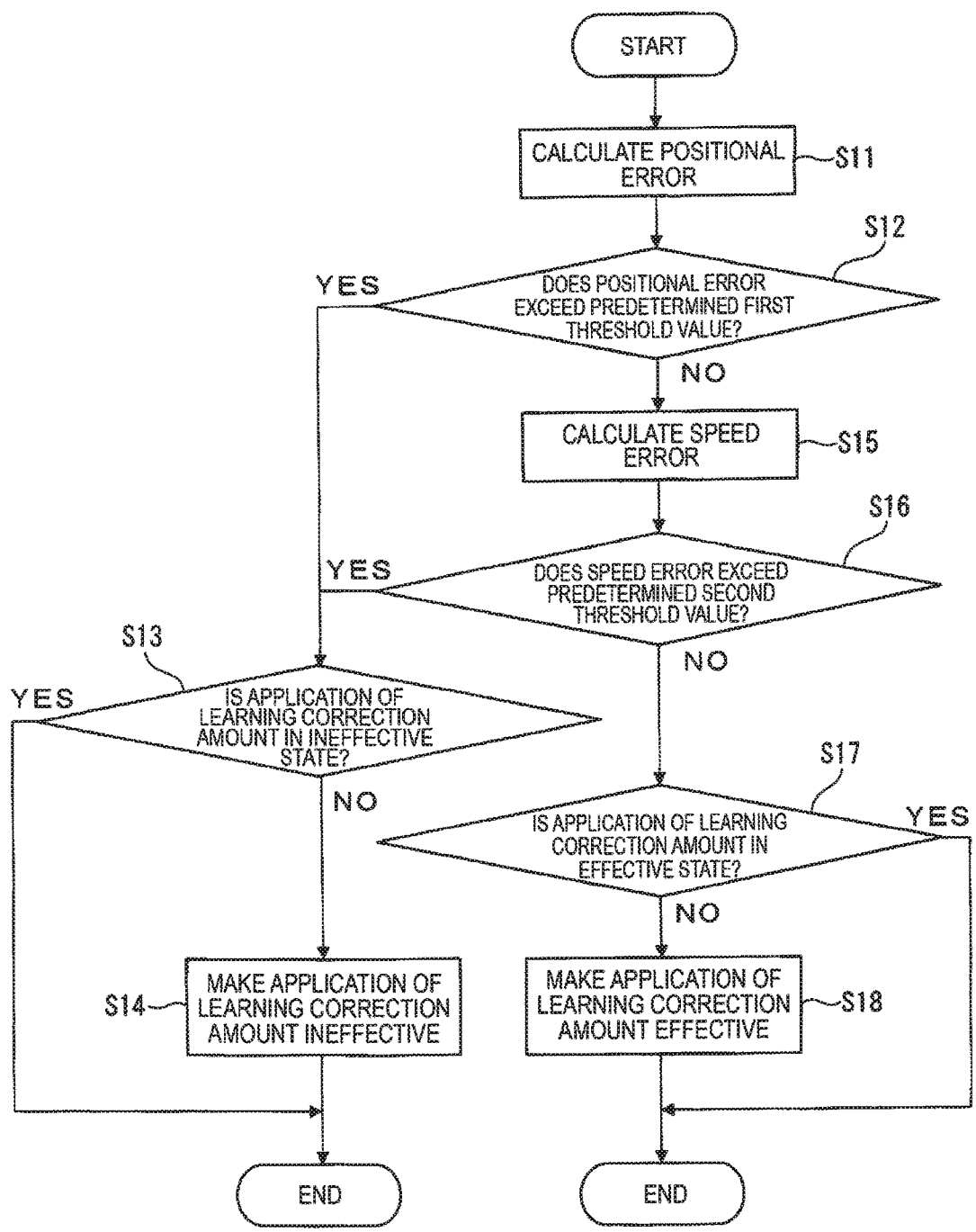
FIG. 2 is a diagram for illustrating a main section of a process flow of the robot control device according to the embodiment of the invention.

FIG. 2 is a diagram for illustrating a main section of a process flow of the robot control device 10 according to the present embodiment. Hereinafter, the operation of the robot control device 10 of the present embodiment will be described with reference to FIG. 1 and FIG. 2.

When the learning control is performed, the switch 27 in the state illustrated in FIG. 1 is switched so that the output destination of the learning control unit 20 is changed from the learning correction amount application-determination unit 25 to the position control unit 16. In addition, the switch 28 in the state illustrated in FIG. 1 is switched so that the output destination of the position detecting unit 13 is changed from the positional error calculation unit 23 to the position storage unit 21. The switch 29 in the state illustrated in FIG. 1 is switched so that the output destination of the speed detecting unit 14 is changed from the speed error calculation unit 24 to the speed storage unit 22. The above switching of the switches 27 to 29 is simultaneously carried out by the learning control start signal that is inputted to the robot control device 10.

During the learning control, the positional deviation amount that is a difference between the position command value from the actuation command unit 15 and the position FB from the pulse coder 12, and a position detected by the position detecting unit 13 are inputted to the learning control unit 20. Then, the learning correction amount is determined in the learning control unit 20 and outputted to the position control unit 16. Further, every time the same actuation command is repeated from the actuation command unit 15, the learning correction amount is written into the memory 20*a* of the learning control unit 20 so as to be updated.

After the learning control is ended, in the case where the robot 100 is actually operated by the actuation command when the learning control was performed, the switches 27 to 29 are each switched to the states as illustrated in FIG. 1. The switching of these switches is simultaneously carried out by the regular operation start signal that is inputted to the robot control device 10.

The process flow that is illustrated in FIG. 2 is a process flow when the robot 100 is actually operated after the learning control. Accordingly, before the process flow illustrated in FIG. 2 is started, the learning control has been ended and the switches 27 to 29 have been each set to the states that are illustrated in FIG. 1, as described above. In addition, the position data (trajectory data) and the speed data of the leading end of the robot mechanism part when the robot was operated by the learning control are each stored in the position storage unit 21 and the speed storage unit 22 that are illustrated in FIG. 1.

Upon the actual operation of the robot 100 being started after the learning control, the positional error calculation unit 23 first receives positions of the leading end of the robot mechanism part from the position detecting unit 13 at the same predetermined time interval T as that when the position storage unit 21 stored the positions of the leading end of the robot mechanism part during the learning control.

The positional error calculation unit 23 calculates the positional error between each of the actual positions of the leading end of the robot mechanism part that is received from the position detecting unit 13 at the predetermined time interval T, and each of the positions of the leading end of the robot mechanism part that corresponds to the above actual position and is stored in the position storage unit 21 (step S11 in FIG. 2).

Subsequently, in step S12 in FIG. 2, the learning correction amount application-determination unit 25 determines whether or not the above-described positional error that is related to the leading end of the robot mechanism part exceeds a predetermined first threshold value. When the positional error exceeds the predetermined first threshold value, the learning correction amount application-determination unit 25 determines that the position is in the abnormal state and determines whether or not the application of the learning correction amount to the position control unit 16 is in an ineffective state (step S13 in FIG. 2).

When, as a result of this determination process, the application of the learning correction amount is not in the ineffective state, the learning correction amount application-determination unit 25 switches the application of the learning correction amount to the position control unit 16 to the ineffective state (step S14 in FIG. 2).

After step S14 or after the application of the learning correction amount determined to be in the ineffective state in step S13, the processes of step S13 and step S14 described above are not carried out until a next determination result is exhibited in step S12.

Alternatively, when the learning correction amount application-determination unit 25 determines in step S12 that the above-described positional error that is related to the leading end of the robot mechanism part is not greater than the predetermined first threshold value, step S15 in FIG. 2 is carried out.

In step S15, the speed error calculation unit 24 calculates a speed error between each of the actual speeds of the leading end of the robot mechanism part that is received from the speed detecting unit 14 at the predetermined time interval T and each of the speeds of the leading end of the robot mechanism part that corresponds to the above actual speed and is stored in the speed storage unit 22.

A time and a timing at which the speed error calculation unit 24 receives the speed of the leading end of the robot mechanism part from the speed detecting unit 14 are the same as those at which the positional error calculation unit 23 described above receives the position of the leading end of the robot mechanism part from the position detecting unit 13.

Subsequently, in step S16 in FIG. 2, the learning correction amount application-determination unit 25 determines whether or not the above-described speed error that is related to the leading end of the robot mechanism part exceeds a predetermined second threshold value. When the speed error exceeds the predetermined second threshold value, the learning correction amount application-determination unit 25 determines that speed is in the abnormal state and carries out the processes from step S13 to step S14 as described above.

On the other hand, when the learning correction amount application-determination unit 25 determines in step S16 that the above-described speed error that is related to the leading end of the robot mechanism part is not greater than the predetermined second threshold value, step S17 in FIG. 2 is carried out.

In step S17, the learning correction amount application-determination unit 25 determines that the speed is in the normal state and determines whether or not the application of the learning correction amount to the position control unit 16 is in the effective state. When, as a result of this determination process, the application of the learning correction amount is not in the effective state, the learning correction amount application-determination unit 25 switches the application of the learning correction amount to the position control unit 16 to the effective state (step S18 in FIG. 2).

After step S18 or after the application of the learning correction amount is determined to be in the effective state in step S17, the processes of step S17 and step S18 described above are not carried out until a next determination result is exhibited in step S16.

Figure 3:
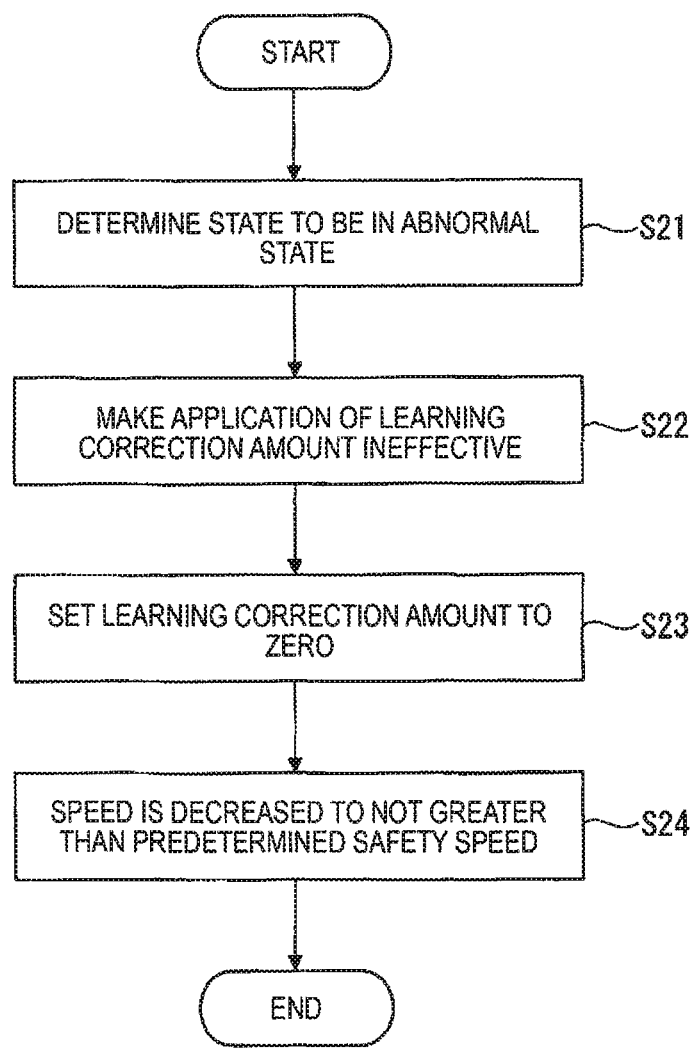
FIG. 3 is a diagram in which processes from step S13 to step S14 that is described in FIG. 2 are illustrated in more detail.

FIG. 3 is a diagram in which processes from step S13 to step S14 that is described in FIG. 2 are illustrated in more detail. Hereinafter, a specific example of the processes from step S13 to step S14 will be described with reference to FIG. 1, FIG. 2, and FIG. 3.

When the determination result in step S12 in FIG. 2 is "YES", in other words, the positional error that is calculated by the positional error calculation unit 23 exceeds the predetermined first threshold value, the learning correction amount application-determination unit 25 determines that the position is in the abnormal state (step S21 in FIG. 3). Further, when the determination result in step S16 described above is "YES", in other words, the speed error that is calculated by the speed error calculation unit 24 exceeds the predetermined second threshold value, the learning correction amount application-determination unit 25 determines that the speed is in the abnormal state (step S21 in FIG. 3).

When it is determined that the position or the speed is in the abnormal state as described above, the learning correction amount application-determination unit 25 switches the application of the learning correction amount to the position control unit 16 to the ineffective state (step 22 in FIG. 3). By adopting this control, the learning correction amount application-determination unit 25 does not output the learning correction amount that is stored in the memory 20a of the learning control unit 20 to the position control unit 16 while the position is determined to be in the abnormal state. For example, the learning correction amount application-determination unit 25 sets the learning correction amount that is outputted to the position control unit 16 to zero (step S23 in FIG. 3).

Subsequently, the learning correction amount application-determination unit 25 outputs the above-described abnormality detection signal to the speed command adjusting unit 26. The speed command adjusting unit 26 decreases the speed command value from the position control unit 16 at a predetermined rate and outputs the decreased speed command value to the speed control unit 17 during the period in which the abnormality detection signal is received. By adopting this control, the speed of the leading end of the robot mechanism part (rotation speed of the servomotor 11) is decreased to a speed that is not greater than the predetermined safety speed during the period in which the speed is determined to be in the abnormal state in the learning correction amount application-determination unit 25 (step S24 in FIG. 3).

The order of step S23 and step S24 described above may be reversed.

Figure 4:
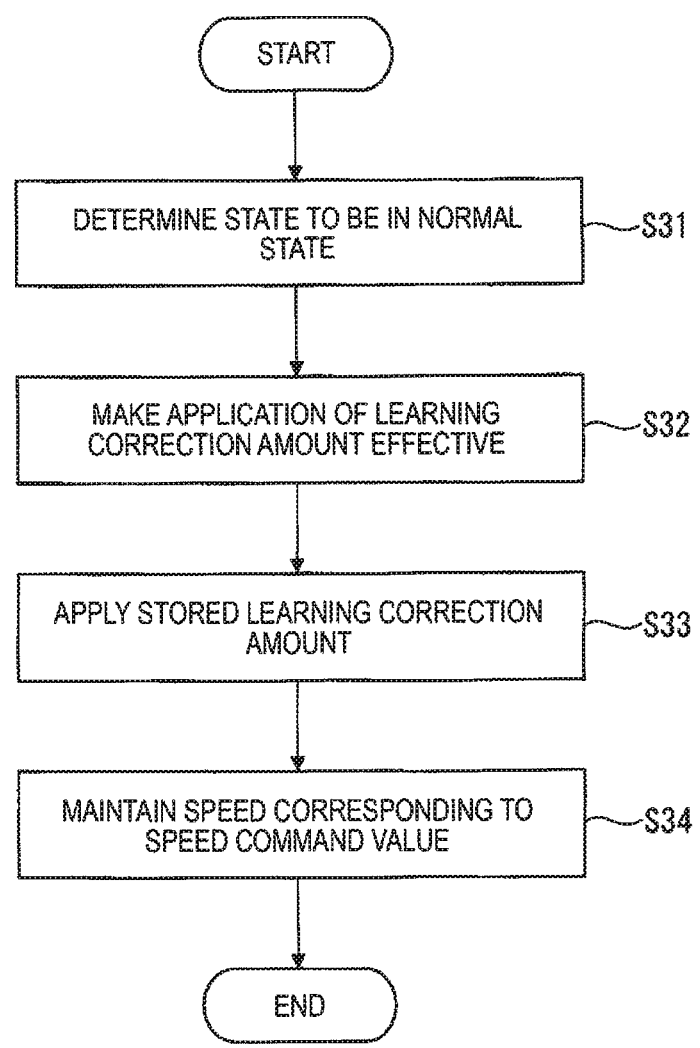
FIG. 4 is a diagram in which processes from step S17 to step S18 that is described in FIG. 2 are illustrated in more detail.

FIG. 4 is a diagram in which processes from step S17 to step S18 that is described in FIG. 2 are illustrated in more detail. Hereinafter, a specific example of the processes from step S17 to step S18 will be described with reference to FIG. 1, FIG. 2, and FIG. 4.

When the determination result in step S12 in FIG. 2 is "NO", in other words, the positional error that is calculated by the positional error calculation unit 23 is not greater than the predetermined first threshold value, the learning correction amount application-determination unit 25 determines that the position is in the normal state (step S31 in FIG. 4). Further, when the above-described determination result in step S17 is "NO", in other words, the speed error that is calculated by the speed error calculation unit 24 is not greater than the predetermined second threshold value, the learning correction amount application-determination unit 25 determines that the speed is in the normal state (step S31 in FIG. 4).

When it is determined that the position and the speed are in the normal states as described above, the learning correction amount application-determination unit 25 switches the application of the learning correction amount to the position control unit 16 to the effective state (step 32 in FIG. 4). By adopting this control, the learning correction amount application-determination unit 25 outputs the learning correction amount that is stored in the memory 20a of the learning control unit 20 to the position control unit 16 during the period in which the position and the speed are determined to be in the normal state. In other words, the learning correction amount application-determination unit 25 applies the learning correction amount that is stored in the memory 20a to the above-described positional deviation amount (step S33 in FIG. 4).

The learning correction amount application-determination unit 25 does not output the above-described abnormality detection signal to the speed command adjusting unit 26 during the period in which the position and the speed are determined to be in the normal state. For this reason, the speed command value from the position control unit 16 is not decreased by the speed command adjusting unit 26. By adopting this control, the speed of the leading end of the robot mechanism part (rotation speed of the servomotor 11) is maintained at a speed that corresponds to the speed command value from the position control unit 16 during the period in which the position and the speed are determined to be in the normal state in the learning correction amount application-determination unit 25 (step 334 in FIG. 4). In other words, in the case where the determination result in the learning correction amount application-determination unit 25 is switched from the abnormal state to the normal state, the speed of the leading end of the robot mechanism part returns from a low speed state to a high speed state.

The order of step S33 and step S34 described above may be reversed.

Figure 5:
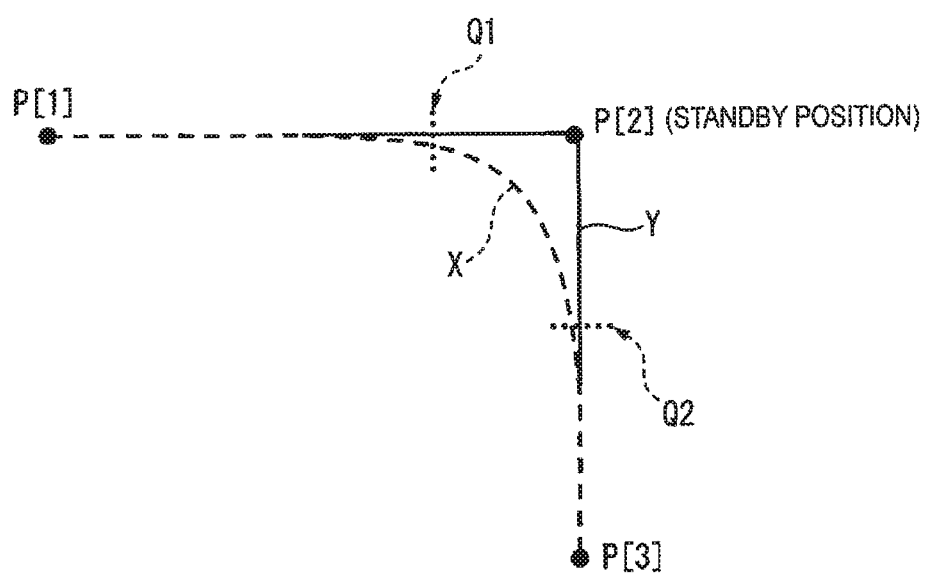
FIG. 5 is a diagram illustrating an example in which a position trajectory of a leading end of a robot mechanism part when a robot operation is carried out by learning control differs from a position trajectory of the leading end of the robot mechanism part when the robot operation is actually carried out after the learning control.

FIG. 5 is a diagram schematically illustrating an example in which a position trajectory of the leading end of the robot mechanism part when the robot operation is carried out by the learning control differs from a position trajectory of the leading end of the robot mechanism part when the robot operation is actually carried out after the learning control.

For example, in the learning control, as indicated by a dotted line X in FIG. 5, the leading end of the robot mechanism part linearly moves by a predetermined distance from a position P1, and thereafter moves in a curvilinear manner. After this, the operation of the robot 100 is carried out so that the leading end of the robot mechanism part further linearly moves so as to reach a position P3.

When the robot 100 is actually operated in a production line after the above-described learning control, an interlock function is operated in some case in order to avoid interference with a peripheral device that is installed near the robot 100, another robot, or the like. This is because, although the learning control is generally performed without considering the operation of the peripheral device or the like installed near the robot 100, the peripheral device near the robot 100 or another robot operates depending on the operation of the robot 100 when the production line is actually in operation.

When the interlock function is operated, the leading end of the robot mechanism part of the robot 100 moves to a position P2 (standby position) that is illustrated in FIG. 5 and stands by there, and moves toward the position P3 after receiving an interlock release signal, for example. Because of this, the leading end of the robot mechanism part draws a different position trajectory from that of learning control, that is, a trajectory that moves from the position P1 to the position P3 via the position P2 as illustrated with a solid line Y in FIG. 5.

When the trajectory of the dotted line X and the trajectory of the solid line Y in FIG. 5 are compared with each other, the trajectory of the leading end of the robot mechanism part that moves from the position P1 to the position P3 significantly differs from the trajectory at the time of learning control near a position Q1 that is illustrated in FIG. 5. Further, the trajectory of the leading end of the robot mechanism part that moves from the position P1 to the position P3 approaches and finally matches the trajectory at the time of learning control near a position Q2 that is illustrated in FIG. 5.

In the case where the learning correction amount that is obtained by the learning control is applied to actual operation control of the robot 100 with the position trajectory of the leading end of the robot mechanism part that does not match the position trajectory at the time of learning control, vibrations or swings are unfavorably generated at the leading end of the robot mechanism part in some cases.

Accordingly, when the actual position trajectory of the leading end of the robot mechanism part significantly differs from the position trajectory of the leading end of the robot mechanism part when the learning control was performed, the robot control device 10 of the present embodiment determines that abnormality has occurred and does not apply the learning correction amount. When the actual position trajectory of the leading end of the robot mechanism part has returned so as to match the position trajectory of the leading end of the robot mechanism part when the learning control was performed, the application of the learning correction amount is restarted.

Accordingly, the robot control device 10 as described above can efficiently suppress vibrations, or swings that can be generated at the leading end of the robot mechanism part and realize a robot operation with high precision. Moreover, the technique of learning control can be effectively used in a large number of industrial robots that can execute a plurality of operation patterns.

A factor that causes a difference between the position trajectory of the leading end of the robot mechanism part when the robot 100 is actually operated after the learning control and the position trajectory at the time of learning control is not limited to only an example in which the leading end of the robot mechanism part is moved to the standby position P2 by the interlock function as described above.

For example, there is a case in which an operator corrects part of the position and part of the trajectory of the leading end of the robot mechanism part that is previously stored in the robot control device 10 through the teach pendant in accordance with conditions of an actual production workshop. In this case, the trajectory of the leading end of the robot mechanism part when the robot 100 is actually operated in the production line will be changed from the trajectory of the leading end of the robot mechanism part when the learning control was performed in advance.

The following can be cited as another factor. For example, in the case where spot welding work for manufacturing a car body is performed by the robot 100, welding positions differ when types of car bodies that is sent to the robot 100 installed in the production line are changed. Because of this, a movement pattern (trajectory) of a welding gun that is attached to the robot 100 needs to be changed. In this case, a robot operation in which the current movement pattern is changed to another movement pattern is needed. At such a branch point of operation, the robot 100 cannot be operated in the same movement pattern (trajectory) as the movement pattern at the time of learning control in some case.

The robot control device 10 of the present embodiment can be applied in a situation where the actual movement pattern is deviated from the movement pattern at the time of learning control due to the above-mentioned factor.

Other Embodiments

When the spot welding work for the car bodies as described above is performed by the robot 100, a plurality of movement patterns of the welding gun of the robot 100 are generally described in an operation program of the robot 100 in accordance with a plurality of car types. A case in which the robot 100 executes operations of the plurality of movement patterns by the robot control device 10 will be described below.

In this case, the actuation command unit 15 of the robot control device 10 that is illustrated in FIG. 1 outputs a position command value in accordance with the movement pattern that corresponds to an operation target of the robot 100 from among the plurality of movement patterns that are described in the robot operation program.

Learning correction amounts for each movement pattern are preferably obtained by performing the learning control in advance for the above-mentioned plurality of movement patterns and stored in the memory 20a of the learning control unit 20.

Figure 6:
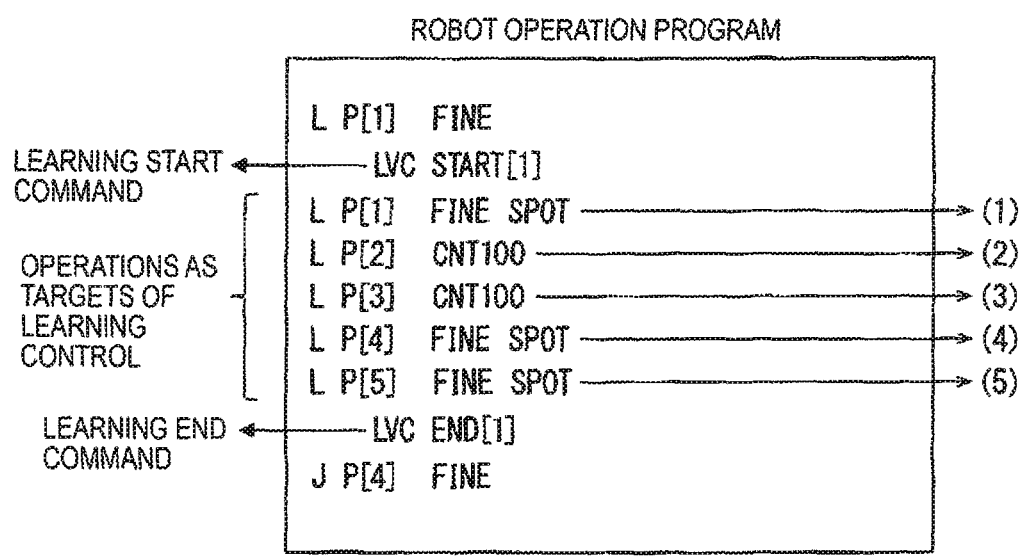
FIG. 6 is a diagram illustrating an example of a robot operation program that includes a section for performing the learning control that is related to each of a plurality of movement patterns.

For example, FIG. 6 is a diagram that illustrates an example of a robot operation program including a section for performing the learning control that is related to each of the plurality of movement patterns described above. As illustrated in FIG. 6, a plurality of robot operations (LP[1] FINE SPOT, LP[2] CNT100, and the like) are described in the robot operation program. In these robot operations, the robot operations as targets of the learning control are sandwiched between a learning start command (LVC START[1]) and a learning end command (LVC END[1]).

The robot control device 10, upon receiving the learning control start signal described above, performs the learning control that is related to predetermined operations of the robot 100. At this time, the robot control device 10 sequentially executes the plurality of robot operations, which are described between the learning start command and the learning end command in the robot operation program as illustrated in FIG. 6, according to the flow of the program from the learning start command toward the learning end command. The operations of the robot control device 10 when performing the learning control have already been described referring to FIG. 1.

Every time the learning control for each of the robot operations is performed according to the flow of the program, the learning correction amount is determined in the learning control unit 20 of the robot control device 10 illustrated in FIG. 1 and stored in the memory 20a. At this time, index numbers, for example, numbers (1) to (5) are assigned as illustrated in FIG. 6 in the order in which the learning control on each of the robot operations is performed. The memory 20a that is illustrated in FIG. 1 stores the index numbers of the respective robot operations and the learning correction amounts that are obtained by the learning control for the respective robot operations in cross-reference with each other. The position storage unit 21 that is illustrated in FIG. 1 also stores the index numbers of the respective robot operations and the position data (trajectory data) of the leading end of the robot mechanism part that are obtained by the learning control for the respective robot operations in cross-reference with each other.

As described above, the index numbers of the respective robot operations, the learning correction amounts that are obtained by the learning control for the respective robot operations, and the position data (trajectory data) of the leading end of the robot mechanism part that are obtained by the learning control for the respective robot operations can be linked to one another.

Accordingly, when the index number of the robot operation that is currently executed and the position of the leading end of the robot mechanism part in the current robot operation are recognized, the learning correction amount that corresponds to the position of the leading end of the robot mechanism part in the robot operation can be specified.

Figure 7:
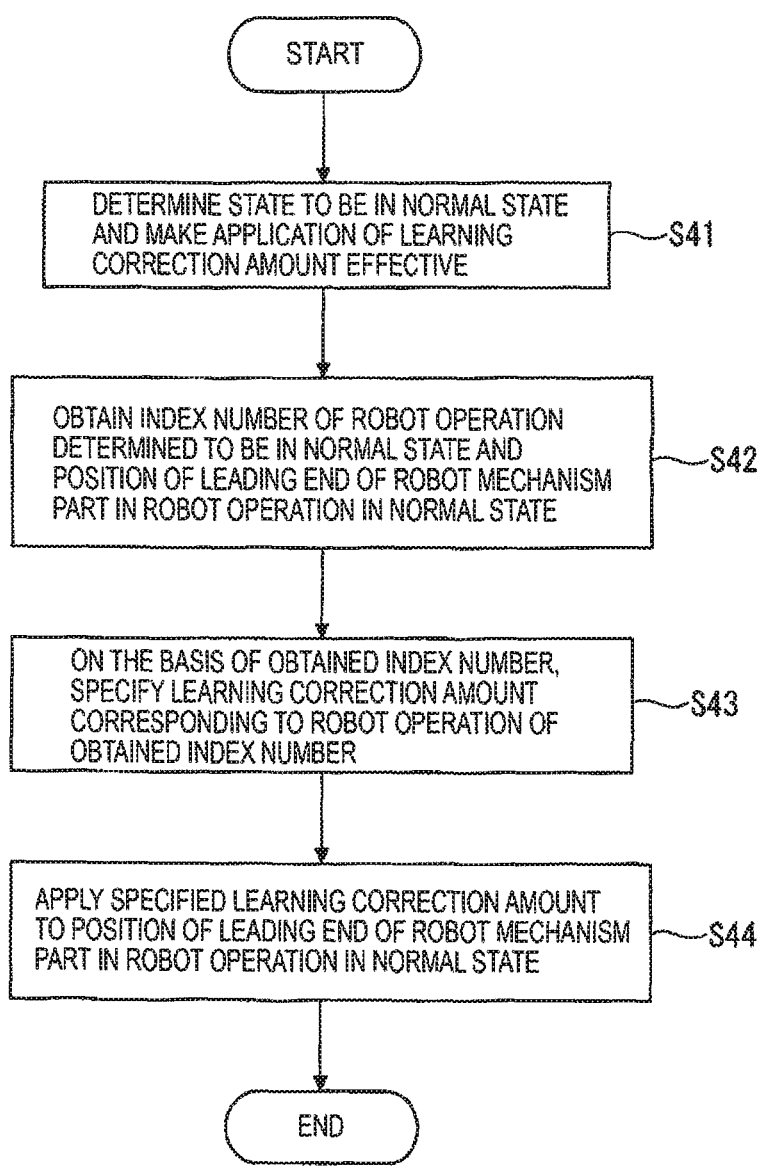
FIG. 7 is a diagram illustrating a process flow when a learning correction amount is specified based on an index number of each of robot operations and a current position of the leading end of the robot mechanism part.

FIG. 7 is a diagram for illustrating a process flow when the learning correction amount is specified based on the index number of each of the robot operations and the current position of the leading end of the robot mechanism part as described above.

Assume that the robot operation of the index number (1) that is illustrated in FIG. 6 is switched to the robot operation of the index number (2) in actual production work by the robot 100.

The robot control device 10 recognizes that the robot operation of the index number (2) in the robot operation program has been executed. Accordingly, the robot control device 10 uses the position data (trajectory data) at the time of learning control, which is stored in the position storage unit 21 and corresponds to the index number (2).

The robot operation of the index number (2) differs from the robot operation of the index number (1). Because of this, in a process of switching to the robot operation of the index number (2), the learning correction amount application-determination unit 25 determines that abnormality is generated at the position of the leading end of the robot mechanism part. In this case, as described with reference to FIG. 2 or FIG. 3, the application of the learning correction amount is in the ineffective state (see step S14 in FIG. 2 and step 322 in FIG. 3).

Thereafter, in the process of switching to the robot operation of the index number (2), the position of the leading end of the robot mechanism part approaches the position trajectory of the leading end of the robot mechanism part that corresponds to the robot operation of the index number (2). Because of this, both the positional error and the speed error respectively calculated by the positional error calculation unit 23 and the speed error calculation unit 24 have values not greater than the predetermined threshold values. By adopting this control, the learning correction amount application-determination unit 25 determines that the position and the speed of the leading end of the robot mechanism part are in the normal states, and switches the application of the learning correction amount to the position control unit 16 to the effective state from the ineffective state (see steps from 331 to 332 in FIG. 4 and step S41 in FIG. 7).

However, although the application of the learning correction amount is in the effective state, the learning correction amount that corresponds to the robot operation of the index number (2) has not been specified yet from data that are stored in the memory 20a. Accordingly, in step S42 in FIG. 7, the robot control device 10 obtains the index number of the robot operation whose position and speed are determined to be in the normal state by the learning correction amount application-determination unit 25 as well as the position of the leading end of the robot mechanism part in the robot operation that is in the normal state.

At this time, since the robot control device 10 recognizes that the robot operation of the index number (2) has been executed, the index number (2) of the robot operation that is currently executed can be obtained. Meanwhile, the position of the leading end of the robot mechanism part in the robot operation that is in the normal state can be obtained from the position detecting unit 13.

Subsequently, in step S43 in FIG. 7, the robot control device 10 specifies the learning correction amount that corresponds to the robot operation of the index number (2) from data stored in the memory 20a on the basis of the obtained index number (2).

Further, in step S44 in FIG. 7, the learning correction amount application-determination unit 25 of the robot control device 10 applies the specified learning correction amount to the position of the leading end of the robot mechanism part in the robot operation that is in the normal state.

According to the above-described process flow, when the position of the leading end of the robot mechanism part that is actually operated after the learning control has returned to the normal state from the abnormal state, the learning correction amount corresponding to the robot operation that is in the normal state is applied to the position of the leading end of the robot mechanism part in the normal robot operation. By adopting this control, when the robot operation is switched to the robot operation of the index number (2) as described above, the learning correction amount that matches to the robot operation can be quickly applied.

The robot control device 10 of the above-described embodiments can be configured by using a computer system including storage units, a central processing unit (CPU), a communication unit, and the like connected to one another through a bus. The storage units are a read only memory (ROM), a random access memory (RAM), and the like. Functions and operations of the actuation command unit 15, the positional error calculation unit 23, the speed error calculation unit 24, the learning correction amount application-determination unit 25, the speed command adjusting unit 26, and the like included in the robot control device 10 as described above, can be achieved by the execution of the program stored in the ROM by the CPU.

According to the present invention, when the robot is actually operated after the learning control, the application of the learning correction amount that is calculated when the learning control is performed in advance can be switched to effective or ineffective in accordance with the actual position and speed of the leading end of the robot mechanism part. By adopting this control, it is possible to efficiently suppress vibrations or swings that are generated at the leading end of the robot mechanism part and realize a robot operation with high precision. Moreover, the technique of learning control can be effectively used in industrial robots capable of executing a plurality of operation patterns.

As described above, the present invention is explained by using the typical embodiments, however, it can be understood by those skilled in the art that modifications on the constituent elements, functions, and the like of the robot control device of the above-described embodiments, various types of other modifications, omission, and addition can be carried out without departing from the scope of the invention.

The invention claimed is:

1. A robot control device configured to control an operation of a robot mechanism part driven by a servomotor, the robot control device comprising:
   a learning control unit configured to perform learning control so as to calculate a learning correction amount for correcting a position of a leading end of the robot mechanism part when the robot mechanism part is operated by a position command;
   a position storage unit configured to store the position of the leading end of the robot mechanism part at a predetermined time interval while the learning control is performed;
   a speed storage unit configured to store a speed of the leading end of the robot mechanism part at the predetermined time interval while the learning control is performed;
   a positional error calculation unit configured to calculate, while the robot mechanism part is operated by the position command after the learning control, a positional error between an actual position of the leading end obtained at a predetermined time interval and the position of the leading end that corresponds to the actual position and is stored in the position storage unit;
   a speed error calculation unit configured to calculate, while the robot mechanism part is operated by the position command after the learning control, a speed error between an actual speed of the leading end obtained at a predetermined time interval and the speed of the leading end that corresponds to the actual speed and is stored in the speed storage unit; and
   a learning correction amount application-determination unit configured to determine, while the robot mechanism part is operated by the position command after the learning control, whether the position and the speed of the leading end are in an abnormal state or in a normal state on the basis of the positional error and the speed error, and then switch a determination as to whether or not the learning correction amount is applied to the position of the leading end in accordance with this determination result.

2. The robot control device according to claim 1, wherein:
the learning correction amount application-determination unit is configured to determine the position or the speed of the leading end to be in the abnormal state when the positional error exceeds a predetermined first threshold value or the speed error exceeds a predetermined second threshold value, and not apply the learning correction amount.

3. The robot control device according to claim 2, wherein:
the learning correction amount application-determination unit is configured to determine the position and the speed of the leading end to be in the normal state when the positional error is not greater than the predetermined first threshold value and the speed error is not greater than the predetermined second threshold value, and apply the learning correction amount.

4. The robot control device according to claim 1, further comprising:
a speed command adjusting unit configured to adjust the speed of the leading end to not greater than a predetermined safety speed when the position or the speed of the leading end is determined to be in the abnormal state by the learning correction amount application-determination unit.

5. The robot control device according to claim 1, wherein:
the learning control unit is configured to store a plurality of the learning correction amounts each corresponding to a plurality of different operations related to the robot mechanism part.

6. The robot control device according to claim 5, wherein:
the learning correction amount application-determination unit is configured to apply the learning correction amount corresponding to the operation of the robot mechanism part being in the normal state from among a plurality of the learning correction amounts stored in the learning control unit when a result of determination on the position or the speed of the leading end is switched to the normal state.

* * * * *